Mar. 3, 1925.
F. V. TISCHER
LAMINATED STRUCTURE
Filed Sept. 17, 1923
1,528,589
3 Sheets-Sheet 1
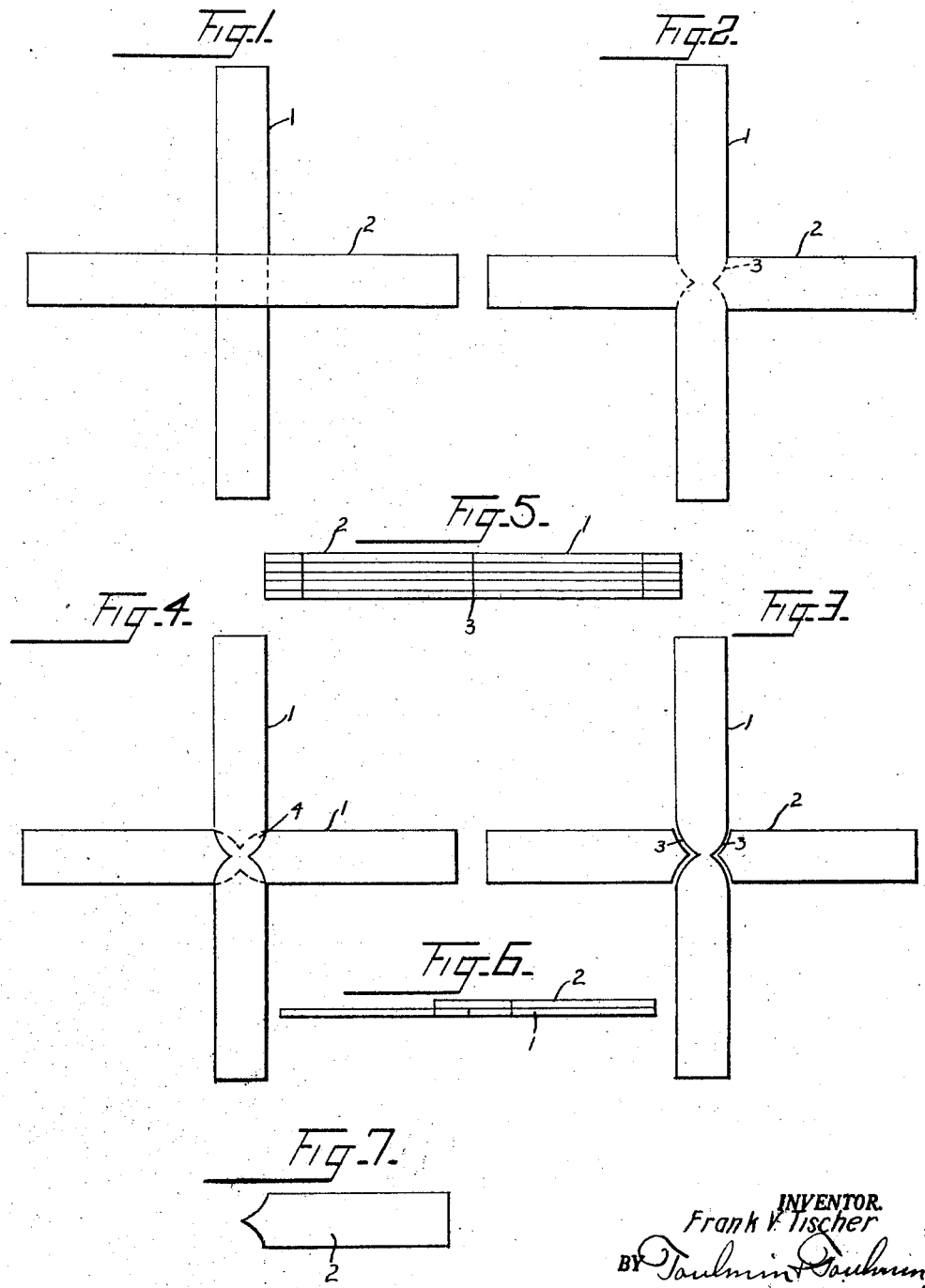

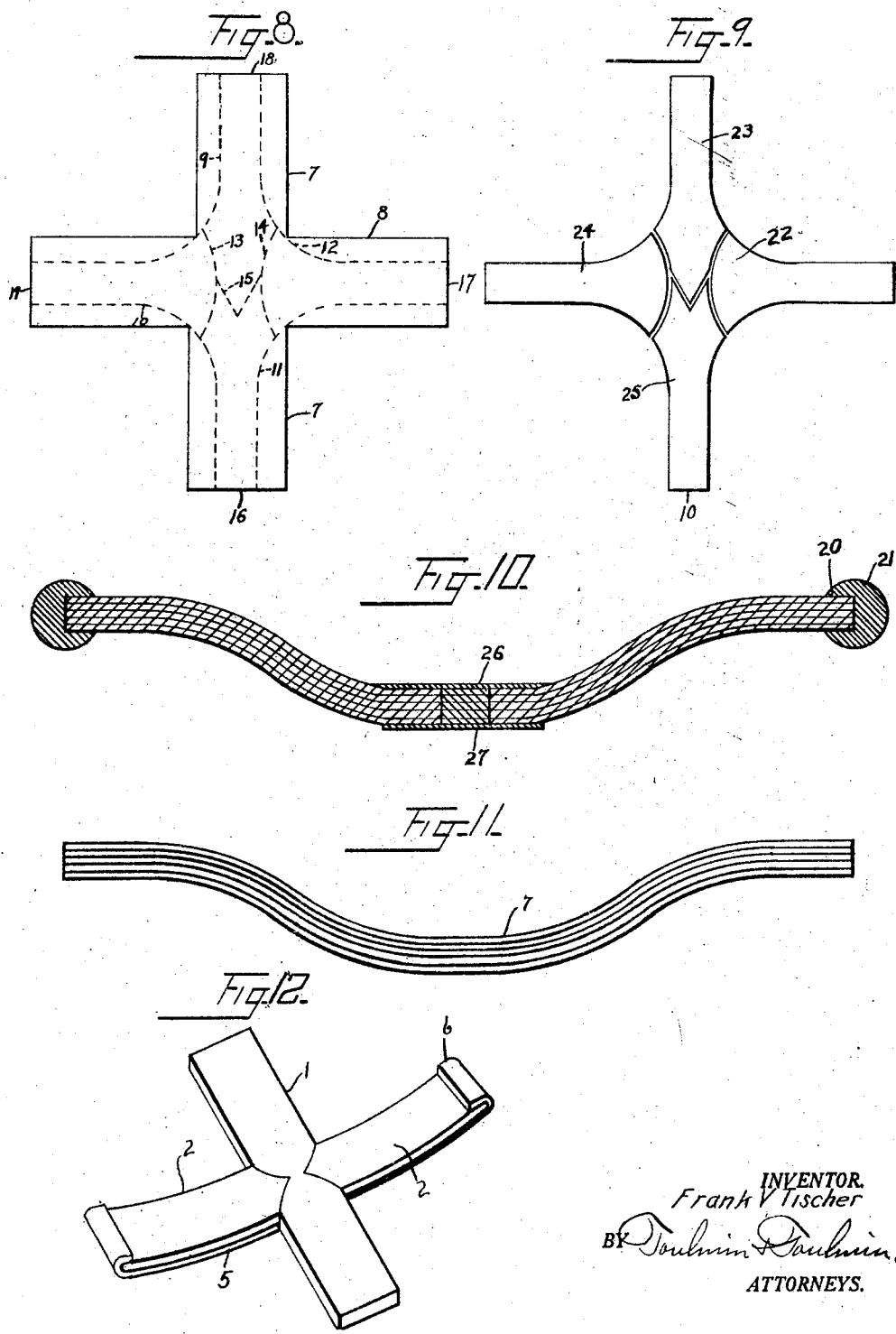

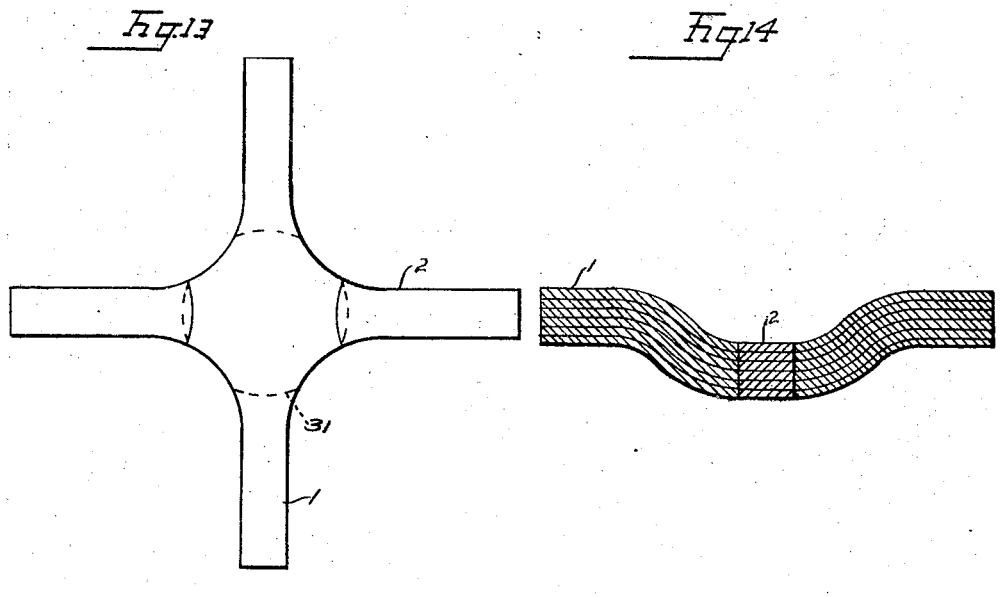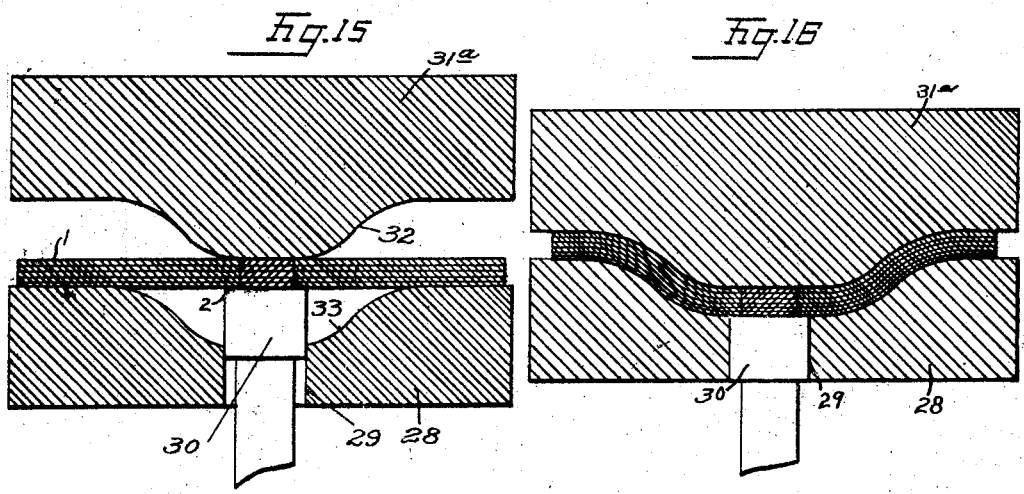

Patented Mar. 3, 1925.

1,528,589

UNITED STATES PATENT OFFICE.

FRANK V. TISCHER, OF DAYTON, OHIO.

LAMINATED STRUCTURE.

Application filed September 17, 1923. Serial No. 663,015.

*To all whom it may concern:*

Be it known that I, FRANK V. TISCHER, a citizen of the United States, residing at Dayton, in the county of Montgomery and State of Ohio, have invented certain new and useful Improvements in Laminated Structures, of which the following is a specification, reference being had therein to the accompanying drawing.

My invention relates to laminated structures, and particularly to laminated structures for steering wheels.

It is the object of my invention to provide a laminated structure for use as a steering wheel spider.

It is a further object of my invention to provide a method and mechanism for forming a spider out of a plurality of similar strips of fiber, wood, and the like which may be turned to any desired shape.

It is my object to provide a wheel that will be very strong, which may be easily manufactured by relatively unskilled labor, and which will have its parts so interlocking that they will be thoroughly reinforced and will have a sufficient factor of safety for all purposes desired.

Heretofore it has been an unsolved problem as to how laminated structures could be used for steering wheel spiders, in view of the fact that it is difficult to produce such structures in quantities, and practically impossible to impart to the structures the compound curve necessary to give the dished effect to the steering wheel. In addition thereto, the location of the steering column in the center of the spider so materially weakened all previous structures that they were unsatisfactory and unsafe. Again, the endeavor to manufacture such structures resulted in such prohibitive losses that it was impossible to commercially make this type of spider.

It is my object to use strips of wood or fiber or the like with a minimum of waste and with the minimum of labor in assembling.

Referring to the drawings:

Figure 1 is a plan view of two of the strips placed one upon the other, prior to treatment and formation into a spider.

Figure 2 is a similar view showing the lines on which the strips are sawed out.

Figure 3 is a similar view showing the strips sawed and severed in their several parts, consisting of a continuous transverse member having V-shaped notches with curved walls on either side of its body near the center. It also shows the severed portions of the other strip, which have V-shaped points with concave walls.

Figure 4 illustrates two of the strips after the V-shaped notches have been taken in them, superimposed upon one another, the dotted line showing the degree of overlapping and the nature of the interlocking structure.

Figure 5 is a side elevation of a pile of these transverse strips, viewed from a point between the outer ends of two of the strips.

Figure 6 is a side elevation of one of the continuous strips and an end elevation of the other continuous strip laid transversely thereon, showing one of the segmental pieces with a pointed end in place.

Figure 7 is a detail of one of the segments with the pointed nose.

Figure 8 is a plan view of a modified form of the steering wheel spider and its method of manufacture. It illustrates two elements consisting of a plurality of laminations located at right angles upon one another. The dotted lines indicate the lines on which the parts are sawed.

Figure 9 illustrates the parts of the wheel as they have been sawed apart.

Figure 10 is a section on the line 10—10 of Figure 9, such section showing also the method of locating the parts in the steering wheel rim and the application of the central laminations.

Figure 11 is a side elevation of one of the elements such as shown in Figure 8, from which the parts are sawed.

Figure 12 is a perspective of the apparatus used for giving the required curvature to the transversely located pieces shown in Figure 3.

Figure 13 is a plan view of the completed structure of the steering wheel spider, such as shown in Figures 1 to 7, the line of the application of the press plunger being indicated in dotted lines.

Figure 14 is a section on the line 14—14 of Figure 13.

Figure 15 is a section through a forming press, showing the first step in the dishing of the steering wheel spider.

Figure 16 is a similar view showing the second or compression step.

Referring to the drawings in detail, it will be seen that strips of wood or the like, such as the rectangular strips 1 and 2 are laid at right angles to one another upon one another. A saw then imparts the cut shown in dotted lines in Figure 2, as at 3. This results in notching the sides of the strip 1 and in severing the strip 2 into two main parts, the ends of which will be of the same configuration as the notches in the first strip and adapted to fit in such notches. The result is seen in Figure 3.

In Figure 4, two strips such as 1 are laid crosswise of one another, the overlapping portions being star-shaped and designated 4, and are indicated by the dotted lines. The severed pieces of 2 are then brought into engagement in the notches 3, as in Figure 6, and glued thereto.

If it is desired to impart a predetermined curvature to the spider to give the dished effect during the making up of the spider, then a metal band, such as shown in Figure 12, designated 5, with turned over end 6, is used. For this purpose, the parts 1 and the strips 2 are brought together as in Figure 3 and glued together, so that the pointed ends of the strips 2 will be glued into the notches of the strip 1 on either side thereof. This thin strip structure is them dished so that its ends will fit beneath the turned over end 6 of the strip 5, the strip 5 being shorter in length than the length of the short pieces 2 and the intermediate strip 1. The succeeding laminations are built up upon this dished structure, following its configuration, and the whole put into the usual press. The purpose of this metal strip is to prevent the breaking and cracking of the unsupported outer strips. Upon the drying of the structure, this thin metal band can be pulled away, and then the steering wheel spider can be turned to the usual shape while it still maintains its dished form.

Returning to the building up of the structure in detail, it will be noted that the short pieces with the pointed ends are laid alternately at right angles, so that there is first a strip with notched sides with a laterally projecting piece 2 glued in the notches, and then a continuous notched strip is laid on top of the two short pieces, and other short pieces are inserted in its notches on top of the first continuous strip. Thus by alternating the overlapping strips an interlocking structure is obtained, the whole being glued together, making a very rigid and strong construction. I prefer to use the concave pointed ends of the small strips and the convex walls of the notches, as this provides a stronger structure with greater overlapping area.

Referring to the Figures 8, 9, 10, and 11, there will be seen in Figure 11 a plurality of continuous laminations of dished shape which have been glued to one another. Such laminations may be glued in large sheets and then sawed into rectangular strips, such as shown in Figure 8. Two of these strips, designated respectively 7 and 8, are laid crosswise of one another. Their outer configuration is formed on the dotted lines 9, 10, 11, and 12, so that the relatively slender arms of the steering spider are formed joined together by broadly sweeping curved portions. Two of the arms are severed on the semi-circular lines 13 and 14, leaving one continuous strip having a narrow throat. This narrow throat is severed by a V-shaped cut 15.

The pieces then have their outer ends 16, 17, 18, and 19 inserted in notches 20 in the steering wheel rim 21. By having these four separate pieces such as shown in Figure 10, which may be respectively designated 22, 23, 24, and 25, it is possible to insert these ends in the notches in the inside of the rim of the steering wheel, and then assemble the inner ends in their original positions. Upon this being done, a strip of veneer, usually in the form of a disc, is laid on top of their abutting ends, this strip being designated 26. A similar strip 27 is placed on the bottom of the central portion of the spider. When the whole structure is thus glued together, it makes an integral composite wheel. A suitable hole can be drilled in the center of the spider for the reception of the steering column.

If it is desired to give the dished effect to the structure built up as shown in Figures 1 to 7, it is possible to do so in the following way. I first build up the structure in the form shown in Figure 13, and in the form shown in the press in Figure 15, the strips being in their original straight condition. This assembly of strips, properly glued to one another, is laid in the die portion of a heavy press, this die portion being designated 28. A part of this die portion is cut away as at 29 to receive a vertically moving plunger 30, which engages with the under side of a laminated structure. This area of engagement is outlined by the dotted line 31 in Figure 13. Superimposed over the die, and in engagement with the laminated structure is a punch 31ª having a protruding portion 32 of the same configuration as the depressed portion 33 of the die. In operation, the plunger is first brought up beneath the laminated structure, so that the central portion of the laminated structure is engaged between the plunger and the punch. The punch is then lowered and at the same time the plunger is lowered, being synchronized with the punch, and while in this supported and clamped position the laminated structure is gradually brought to the configuration shown in Figure 14 and Figure 16, being suitably held in such position for the requisite length of time for the structure to take its shape and to dry. By this clamping of the laminations together, I prevent the tearing and breaking particularly of the lower laminations when the dished structure is formed.

It will be understood that I desire to comprehend within my invention such modifications as may be fairly embraced within it, and as may be found necessary in adapting it to various conditions in the art in the course of the application of the invention.

Having thus fully described my invention, what I claim as new, and desire to secure by Letters Patent, is:

1. In a steering wheel spider, transversely located strips having notched sides and interlocking pieces having ends adapted to fit in such notched portions, said first-mentioned strips with the notched sides being located alternately at right angles to one another.

2. In a steering wheel spider, a plurality of superimposed laminations, said laminations being located at right angles to one another in two groups, and said laminations being severed into four parts, two of said parts having semi-circular convex ends, and the other two of said parts having portions of their ends notched and pointed to engage one another, and the said ends being semi-circular to engage with the semi-circular ends of the other two members.

3. In a steering wheel spider, a plurality of superimposed laminations, said laminations being located at right angles to one another in two groups, and said laminations being severed into four parts, two of said parts having semi-circular convex ends, and the other two of said parts having portions of their ends notched and pointed to engage one another, and the said ends being semi-circular to engage with the semi-circular ends of the other two members, a steering wheel rim in which the ends of said members are embedded, and means for engaging the inner ends of said members on the side thereof.

4. In a method of forming a laminated spider, laying rectangular strips at right angles to one another, sawing said strips at their point of juncture, whereby one of said strips is notched on its sides, and the other of said strips is formed into interlocking portions having ends fitting in said notches of the first strip, and assembling a plurality of said notched strips and interlocking portions having ends fitting in the notches alternately, so that the notched strips will be alternately at right angles to one another and will have the interlocking pieces fitting in on either side thereof into the notches, said interlocking pieces being embraced between the notched strips.

5. In a method of forming a laminated spider, laying rectangular strips at right angles to one another, sawing said strips at their point of juncture, whereby one of said strips is provided with notched sides, and the other of said strips forms interlocking portions having ends fitting in said notches of the first strip, and assembling a plurality of said notched strips and interlocking portions having ends fitting in the notches alternately, so that the notched strips will be alternately at right angles to one another and will have the interlocking pieces fitting in on either side thereof into the notches, said interlocking pieces being embraced between the notched strips, gluing the interlocking ends of the pointed pieces in the notches of the other strips, and gluing all of the strips and pieces to one another.

6. In a method of forming a laminated steering wheel spider, building up a laminated structure of transversely located strips having notched sides and interlocking pieces inserted in said notched sides, said transversely located strips being located at right angles to one another alternately, placing said assembled structure in a die, supporting the center of said laminated structure by a moving plunger, imposing a punch adapted to engage first with the center portion of said laminated structure and to embrace it between the punch and the plunger, lowering said plunger and simultaneously lowering said punch, and drawing said laminated structure thus embraced between the punch and the plunger into the die to conform to the configurations of the die and punch.

7. In a process of forming a laminated steering wheel spider and steering wheel, arranging two series of laminations at right angles to one another, cutting out a steering wheel spider therefrom, severing said spider into four parts adjacent the central portion of the laminated structure, inserting the outer ends of said parts in the inner wall of the steering wheel rim, fitting the inner ends of said parts in engagement with one another, and fastening said inner ends to one another.

In testimony whereof, I affix my signature.

FRANK V. TISCHER.